US005765589A

United States Patent [19]

Stoll et al.

[11] Patent Number: 5,765,589

[45] Date of Patent: Jun. 16, 1998

[54] VALVE ARRANGEMENT

[75] Inventors: Kurt Stoll; Dieter Beyer, both of Esslingen, Germany

[73] Assignee: Festo KG, Esslingern, Germany

[21] Appl. No.: 675,347

[22] Filed: Jul. 3, 1996

[30] Foreign Application Priority Data

Jul. 20, 1995 [DE] Germany ........................ 195 26 459.2

[51] Int. Cl.[6] ........................................ F16K 11/07

[52] U.S. Cl. ........................ 137/271; 137/596.16

[58] Field of Search ........................ 137/271, 596.16

[56] References Cited

U.S. PATENT DOCUMENTS

| | | | |
|---|---|---|---|
| 3,464,444 | 9/1969 | Tennis | 137/596.12 |
| 4,082,108 | 4/1978 | Dininio | 137/271 X |
| 4,718,451 | 1/1988 | Kosugi | 137/596.16 |
| 4,842,021 | 6/1989 | Stoll | 137/271 X |
| 5,443,093 | 8/1995 | Stoll et al. . | |

FOREIGN PATENT DOCUMENTS

| | | |
|---|---|---|
| 0 116 500 A1 | 8/1984 | European Pat. Off. . |
| 35 10 283 A1 | 9/1985 | Germany . |
| 37 01 211 A1 | 8/1987 | Germany . |
| 39 19 413 A1 | 12/1990 | Germany . |
| 40 20 024 A1 | 1/1992 | Germany . |
| 41 37 868 C2 | 5/1993 | Germany . |
| 41 43 274 A1 | 8/1993 | Germany . |

*Primary Examiner*—John Fox
*Attorney, Agent, or Firm*—Hoffmann & Baron, LLP

[57] ABSTRACT

A valve arrangement comprising several valve units placed in rows side by side in the a direction in a common row defining plane. Each valve unit comprises a base plate with supply and venting ducts extending therethrough and two mutually parallel spool receiving spaces each having a valve spool. The supply and venting ducts run in the partition, placed between the two spool receiving spaces, of the base plate and simultaneously communicate with the two spool receiving spaces. Such a valve arrangement may be manufactured with compact dimensions and have high flow through rates.

16 Claims, 1 Drawing Sheet

VALVE ARRANGEMENT

BACKGROUND OF THE INVENTION

The invention relates to a valve arrangement comprising a plurality of valve units, which in a row direction are so sequentially arranged side by side in a common row defining plane that longitudinal axes thereof extend in parallelism to the row defining plane and at the same time at a right angle to the row direction, each valve unit including a base plate with internal valve ducts, a principal valve with a spool receiving space extending parallel to the longitudinal axis and a valve spool arranged in a longitudinally movable manner therein and at least one electrically operated actuating device serving for control of the principal valve, said valve ducts including at least one supply duct and at least one venting duct, said ducts communicating with the spool receiving space and so extending through the base plate in a direction parallel to the row direction from the front surface to the rear surface that they may communicate with similar valve ducts in the base plate of an immediately adjacent valve unit.

THE PRIOR ART

A valve arrangement of this type is disclosed in the German patent publication 4,143,274 A1. It comprises a plurality of valve units grouped together as a block-like unit in rows and which each possess a base plate, through which supply and venting ducts extend. On each base plate a principal valve designed in the form of a multiway valve is arranged, which contains a valve spool receiving space fitted with a spool, and which communicates with the ducts in the base plate. For control of the principal valve there is an electrically operated actuating device in the form of a solenoid valve, which is integrated in the base plate and is able to affect the actuation of the valve spool by an operating fluid.

Since the supply and venting ducts are relatively far removed from the principal valve, for connection with the valve spool receiving space special branch ducts are necessary which result in there being relatively long air flow paths and which limit the possible flow through rate. Furthermore, this design involves a relatively large overall size.

SHORT SUMMARY OF THE INVENTION

One object of the invention is to provide a valve arrangement of the sort noted initially, which while having a compact structure, permits having shorter air passages and improved flow through rates.

In order to achieve this and/or other aims appearing from the present specification, claims and drawings, the invention contemplates an arrangement such that each respective valve unit comprises two principal valves, which are arranged at a right angle to the row defining plane in superposed relationship, that the base plate of each respective valve unit is designed in the form of a common housing of the two principal valves and possesses two superposed, mutually parallel valve spool receiving spaces each having one valve spool, and the at least one supply duct and the at least one venting duct extend in the partition, of the base plate, placed between the two valve spool receiving spaces and at the same time communicate with the two valve spool receiving spaces arranged in the base plate.

It is in this manner that the base plate and two principal valves are connected together as a practically integral structural unit. The supply and venting ducts present may be arranged in the immediate vicinity of the valve spool receiving spaces so that there are only short air flow paths. The design of each particular valve unit as a double valve offers the advantage that it is possible to have short overall lengths of the valve arrangement. The accompanying increase in the overall height is kept within reasonable limits, because the supply and venting ducts in the partition extend between the two spool receiving spaces and accordingly simultaneously are associated with the two principal valves. All in all therefore an extremely compact design of the valve arrangements is possible.

A prior published German patent application P 44 13 657.9-53 describes a valve arrangement, in which a base plate constitutes the housing of a principal valve so that there are also short air flow paths and high flow through rates. The particularly valuable features for the creation of a double valve integrated in a common base plate are however not provided here.

Furthermore valve arrangements with individual valve units have been proposed, in which switching valves are integrated in a base plate. In this connection reference may be had to the German patent publication 3,510,283 A1, the European patent publication 0 116 500 A1, the German patent publication 3,919,413 A1 or the German patent publication 3,701,211 A1. In all these cases the actuation of the valve spool is however performed directly mechanically and without any special electrically driven actuating devices.

The German patent publication 4,137,868 C2 discloses a valve, whose housing is made up of a base plate containing the spool receiving space, and two terminating parts mounted on the ends thereof, electrically driven actuating devices in the form of solenoid valves being provided for control of the valve spool. A similar arrangement is illustrated in the German patent publication 4,020,024 A1, in the case of which furthermore the actuating devices present are arranged on the same end surface on the housing. There is however just as little question of a double valve design as of the integration of a principal valve in a base plate with the supply and venting ducts extending through same in a row direction.

Advantageous further developments of the invention are defined in the claims.

It is convenient for the valve ducts extending in a respective base plate to comprise two sets of working fluid ducts, which render possible connection of loads to be supplied and on the one hand communicate with one of the spool receiving spaces and on the other hand open at mutually opposite top and bottom side surfaces of the base plate. It is in this manner that drive fluid lines may be conveniently led off at the top and at the bottom, which are connected with the working fluid ducts.

If the ports, present at the bottom and/or top side surface, of the working fluid ducts, are covered over by a connection plate, which has connection openings communicating with the ports, it is possible for the valve arrangement to be particularly simply adapted to national standards applying for different countries. It is merely necessary to mount connection plates as may be required, whose connection openings are provided with connecting screw threads of the particular national standard.

One contribution to compactness of the valve arrangement is also provided by the paired arrangement of two electrically operated actuating devices to give one actuating unit able to be mounted on the respective base plate, the actuating devices preferably including an electromagnetic device and being more particularly designed in the form of solenoid valves. Actuating devices of this type are disclosed in the German patent publication 4,309,695 A1 for example. They also render possible a particularly simple connection of the superposed actuating devices with an electrical control unit, which is preferably arranged over or underneath the row of valve units adjacent to the top or bottom side surfaces of the base plates arranged in a row. Using this control unit the manner of operation of the actuating devices may be set, and with it the switching state of the principal valves.

Preferably the control unit comprises at least one printed circuit board extending in parallelism to the row defining plane of the valve units, such printed circuit board being more particularly simultaneously electrically connected with all actuating devices by means of electrical connection contacts and serving as a means for the supply of the actuating signals to the actuating devices. This printed circuit board may be a simple "dumb" signal distribution board, which only serves to pass on control signals coming form an electronic control device. The electronic control device is however conveniently also a direct component of the control unit, which preferably extends in a plane parallel to the first printed circuit board.

The control unit can be also fitted with a field bus communication unit, which as part of a serial data transfer system renders possible communication with an external electronic control device or, respectively, the communication between a plurality of separately arranged valve arrangements inter se. The connection may here take place using a suitable field bus, for example a so-called ASI bus or a so-called PROFI bus.

In the following an account will be provided of the invention with reference to accompanying drawings.

LIST OF THE SEVERAL VIEWS OF THE FIGURES.

Figure 2:
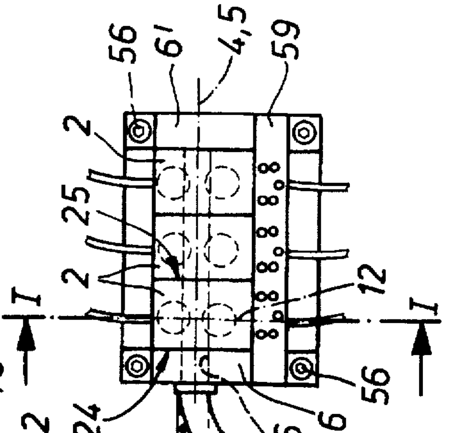
FIG. 2 is a lateral elevation of the complete valve arrangement looking in the direction of the arrow II of FIG. 1.
Figure 1:
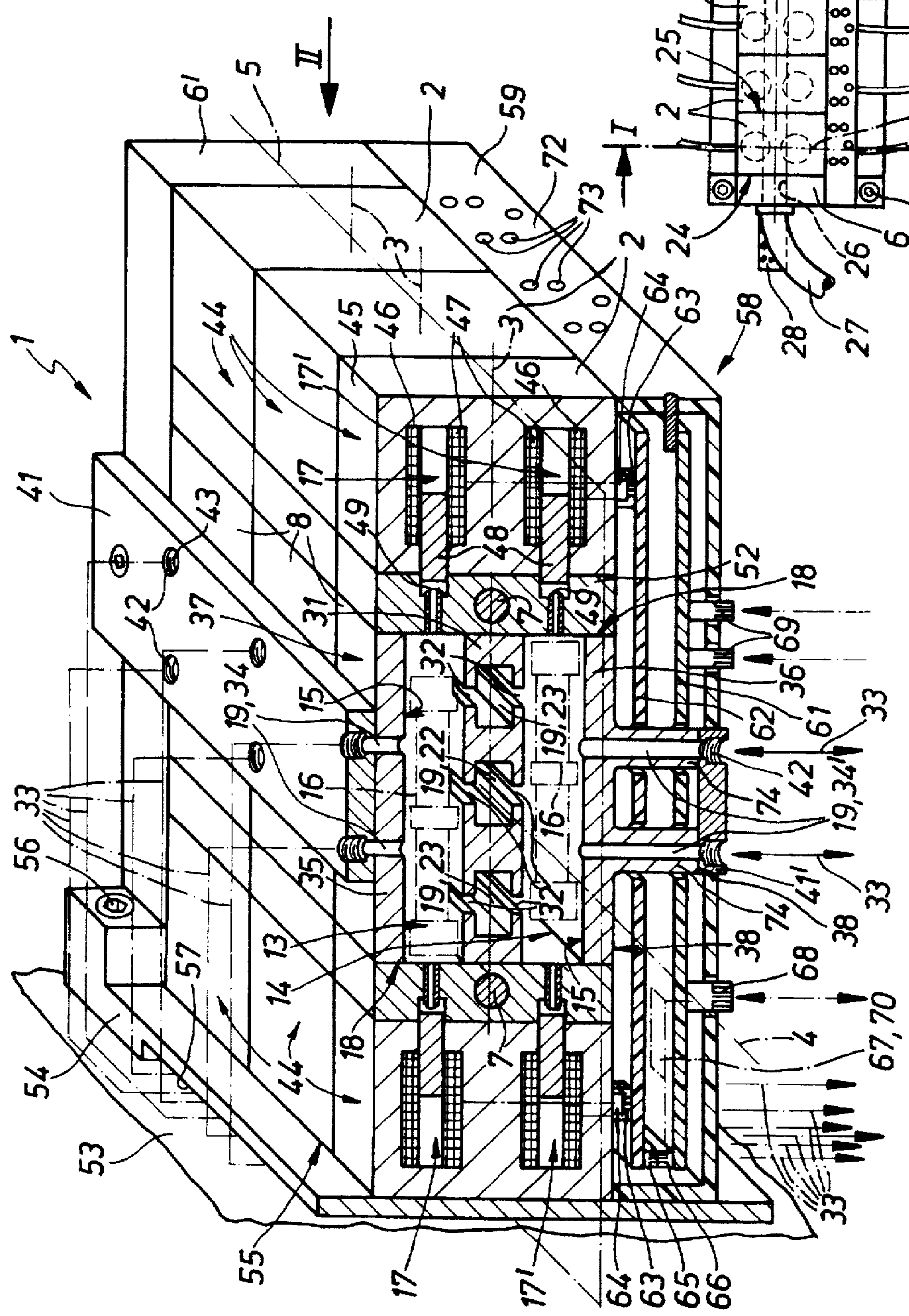
FIG. 1 shows a first design of the valve arrangement of the invention in a diagrammatic perspective elevation, the front portion being shown cut away on the section line I—I in FIG. 2 in order to render clear the internal structure of a valve unit.

DETAILED ACCOUNT OF WORKING EMBODIMENT OF THE INVENTION.

A valve arrangement generally referenced 1 comprises several (in the present case, three) valve units 2, with which the distribution of a fluid, more particularly compressed air, serving for the operation of loads, which are not illustrated in detail, may be controlled. Controlled loads are for example fluid power cylinders.

The individual valve units 2 each possess an elongated structure, their longitudinal axes being referenced as 3.

The valves units 2 are collected together as a compact unit. For this purpose they are so placed side by side sequentially in a row direction 4 in a common row defining plane 5 that the longitudinal axes 3 thereof extend in parallelism to the row defining plane 5 and simultaneously extend at a right angle to the row direction 4. Directly adjacent valve units 2 have their facing surfaces directly in firm engagement with each other. On the first and on the last valve unit 2 a respective terminating plate 6 and 6' is arranged, between which the valve units 2 are firmly clamped together. Connection together is ensured by ties 7 extending in the row direction 4 and transversely through all valve units 2, such ties being secured at the terminating plates 6 and 6'. In this fashion a block-like structural unit is obtained.

Each valve unit 2 comprises a central base plate 8, whose plate plane 12 is at a right angle to the row defining plane 5 and in parallelism to the associated longitudinal axis 3. It has a substantially rectangular cross section.

Each respective base plate 8 constitutes the housing of two superposed principal valves 13 and 14 which are arranged with a mutual offset in the plate plane 12 and have longitudinal axes which are consequently at a right angle to the row direction 4. Each of these principal valves 13 and 14 comprises a spool receiving space 15, which in the present embodiment is substantially cylindrical and is aligned to be parallel to the longitudinal axis 3. It is in this manner that for each base plate 8 there are two superposed and mutually parallel spool receiving spaces 15, in which a respective valve spool is located which is indicated only in broken lines.

The valve spool 16 is received in the spool receiving space 15 in a longitudinally sliding manner and can hence assume various different switching positions. These switching positions are set as required using electrically operated actuating devices 17 and 17', which are detachably mounted at the two oppositely end surfaces 18 of each base plate 8. In a familiar fashion they control the supply of an actuating fluid, in the present case compressed air, to the oppositely placed end surfaces of the valve spool 16 in order to operate same and accordingly to shift it in the one or in the other direction.

Each base plate 8 has a plurality of valve ducts 19 extending through it. In the illustrated working embodiment such ducts include a supply duct 22 and two venting ducts 23, which extend transversely, i. e. in parallelism to the row direction 4, through the base plate 8 with the result that same respectively open at the front surface 24, facing in the row direction 4, and the rear surface 25 of the base plate 8. The distribution of these valve ducts 19, 22 and 23 in the base plate 8 is the same in all valve units 2 so that the duct ports of adjacent valve units 2 are aligned with each other and respectively form common ducts extending right through in the row direction 4.

The rear terminating plate 6' is completely closed or free of openings and consequently constitutes an end termination of the through valve ducts 19, 22 and 23. On the other hand the front terminating plate 6 is provided with connection openings 26, which are aligned with the above mentioned valve ducts 19, 22 and 23. Through them fluid as required for operation of the valve arrangement 1 is introduced under pressure into the supply duct 22, a corresponding supply line being indicated at 27. At the connection openings 26, communication with the venting ducts 23, it is respectively possible for a silencer 28 to be fitted for ensuring noise-reduced discharge of the fluid.

The supply and venting ducts 22 and 23 preferably extend in the partition wall/31, placed between the two spool receiving spaces 15, of a respective base plate 8. The arrangement of the present embodiment of the invention is such that the supply duct 22 extends approximately centrally at the same distance from the two end surfaces 18 and on either side is flanked by a respective venting duct 23, which runs in the region between the supply duct 22 and a respective end surface 18.

The central arrangement of the supply and venting ducts 22 and 23 is complemented by the further feature that each of these ducts simultaneously communicates with the two associated spool receiving spaces 15. Both the supply duct 22 and also the two venting ducts 23 open peripherally into the two spool receiving spaces 15. This is preferably made possible by so designing and arranging the said valve ducts 19, 22 and 23 so that both parts 32 of their cross section transversely extend through the spool receiving spaces 15. This leads to optimum flow through the two principal valves, because within each valve unit 2 the fluid does not firstly have to flow through a branch duct into the associated spool receiving space or, respectively, out of same. At the above mentioned sections 32 of the duct cross sections the flow through the spool receiving spaces 15 is transverse in direction so that an optimum degree of filling becomes established. Since the principal valves are integrated in the base plate 8, the design of the individual valve ducts can be adapted to requirements without any trouble.

The position of a respective valve spool 16 sets the flow, indicated by arrows 33, of the pneumatic fluid to or from the loads. The fluid in this case flows via fluid lines, not illustrated in detail, which are connected with working fluid ducts of each principal valve 13 and 14.

Among the valve ducts 19 extending in each respective base plate 8 there are in the embodiment two sets of working fluid ducts 34 and 34', which respectively include two working fluid ducts. The first set of working fluid ducts 34 extends through the top plate wall 35, located over the top spool receiving space 15, it on the one hand opening peripherally into the top spool receiving space 15 and on the other hand opening at the externally placed top side surface 37 of the base plate 8. In a corresponding fashion the plate wall 36, extending underneath the bottom spool receiving space 15, of a respective base plate 8 has the second set of working fluid ducts 34' extending through it vertically, which on the one hand open in the bottom spool receiving space 15 and on the other hand open at the bottom side surface 38 of the base plate 8.

Adjacent to their external ports the working fluid ducts 34 and 34' are provided with attachment screw threads, which render possible a direct connection of the said fluid lines. In the present case a so-called BSP thread is employed. However in the illustrated embodiment it is not used because from another aspect a different thread is desired, as for example a so-called NTP thread. In order to provide these screw threads the ports of the working fluid ducts 34 and 34' associated with each side surface 37 and 38 are covered over by a rail-like connection plate 41 and 41', which is provided with connection openings 42, whose distribution is the same as those of the two rows of ports. These connection openings 42 each have the fastening screw thread 43 in question. Since the connection plates 41 and 41' are detachably mounted, simple exchange is possible in order to, as required, to re-fit with the desired type of screw thread.

It will be clear that in the transition region between a respective connection plate 41 and 41' and the base plate 8 seals, not illustrated, will be present, seals also being present between respectively adjacent valve units 2 in the peripheral portion of facing ports of the supply and venting ducts 22 and 23.

Dependent on the position of the valve spool 16 the fluid under pressure may flow from the supply duct 22 into a working fluid duct 34 and 34' or from a working fluid duct 34 and 34' into a venting duct 23, flow taking place through the associated spool receiving space 15.

In the embodiment of the invention two actuating devices 17 and 17' are provided for each principal valve 13 and 14. In this respect the actuating device 17 and 17' mounted on a common external surface 18 are preferably collected together in one actuating unit 44 so that uniform assembly and dismounting is possible on the base plate 8. Each actuating device 17 and 17' comprises a conventional electromagnetic device 46 with a coil 47 and a moving armature 48, which are jointly accommodated in a housing 45 of the actuating unit 44. The armature 48 extends in parallelism to the longitudinal axis 3 and may be driven linearly by excitation of the coil 47, it constituting a valve member, which in cooperation with an oppositely placed valve seat 49 controls the flow and/or removal of the actuating fluid in an end region of a spool receiving space 15. A respective actuating device 17 and 17' is in the present case consequently designed in the form of a solenoid valve, whose valve seat 49 is however not a direct component of the actuating device 44, but is rather formed on an intermediate plate 52, which is placed between the actuating device 44 and the associated end surfaces 18 of the base plate 8.

The actuating fluid controlled by the actuating devices 17 and 17' can be tapped from the supply duct 22 or be supplied via separate pilot supply ducts.

The valve arrangement 1 may with advantage be secured laterally on any desired supporting wall 53 so that it projects from it and its top and bottom sides are freely accessible. This facilitates the making the necessary fluid and electrical connections. As a means assisting attachment to a wall there is in the present case an attachment plate 54, which is secured to a side surface of the row of valve units 2 and can be secured with the aid of fastening screws 56 or other fastening means to the supporting wall 53 detachably. The attachment thereof to the valve arrangement is conveniently using the two end connection plates 6 and 6', to which the attachment plate 54 may be screwed in a manner which is not illustrated in detail.

The attachment plate 54 is so designed that in the state mounted on the supporting wall 53 as well there is a duct 57 extending through in the vertical direction of the valve arrangement 1, such duct rendering it possible for the fluid ducts branching from the top working fluid ducts 34 to be protected as they extend downward.

In addition to the advantageous design of the valve units 2 the valve arrangement 1 offers the further advantage of providing a particularly satisfactory position for an electrical control unit 58 for the actuating devices 17 and 17'. The same is mounted completely underneath the row of valve units 2 in the vicinity of the bottom side surfaces 38 of the base plates 8.

The electrical control unit 58 is accommodated in a guard housing 59 mounted from below on the row of valve units 2. The front and rear surfaces thereof and furthermore the two end surfaces are substantially flush with the correspondingly aligned external surfaces of the valve units 2 and, respectively, terminating plates 6 and 6' so that the result is a neat compact and block-like unit.

The control unit, which in the example is electrical, comprises a first printed circuit board 62 extending in parallelism to the row defining plane 5, said printed circuit board being provided with several upwardly directed electrical connection contacts 63. The first printed circuit board 62 is mounted from below on the valve unit 2, its electrical connection contacts 63 simultaneously being in contact with complementary further electrical connection contacts 64, which are provided on the bottom side of the actuating units 44 and are connected with the actuating devices 17 and 17'. The actuating units 44 may in this respect have a configuration as described in the said German patent publication 4,309,695 A1.

Printed wiring provided on the first printed circuit board, which is however not illustrated, constitutes a connection between the electrical connection contacts 63 on the plate side, and a multipole connection device 65 also provided on the first printed circuit board 62. The latter for its part is detachably electrically connected with a complementary second multipole connection device 66 of a second printed circuit board 61, which is arranged in parallelism underneath, and spaced from, the first printed circuit board 62. The printed circuit board 62 is provided with an only diagrammatically indicated electronic control device 67, which is made up of the electronic control device 67 arranged on the printed circuit board. It is constituted by a memory programmable control device (SPS), which may be programmed as required using a downwardly extending plug connector 68.

In operation the first printed circuit board 62 functions as a distribution board for electrical actuating signals, which passes on the control signals, received from the electronic control device 67, in accordance with instructions, to the respective electronic connection contacts 64 and, respectively, the associated actuating devices 17 and 17'.

In the case of need a managing or supervising external control device may also be connected via the plug connector.

Via the plug connector or another suitable plug connector it is furthermore possible to create a possible connection means for a field bus, which is particularly in the form of a dual wire bus and, using serial transmission technology, supplies signals which are received by a field bus communication unit installed on the second printed circuit board 61, deciphered and passed on to the actuating units 44.

It is possible to provide both an electronic control device 67 and also a field bus communication unit 70 on the second printed circuit board 61, the device, as illustrated, also being able to be made part of the same structure.

The field buses to be connected may for instance be a so-called ASI bus or a PROFI bus.

In the illustrated working embodiment the second printed circuit board 61 additionally has electrical inputs 69, via which sensor signals may be supplied, which are processed by the electronic control device 67.

The electrical control unit may also perform a diagnostic function involving the use of pressure sensors. The pressure sensors may be connected with the working fluid ducts 34 and 34' in order to produce a signal, suitable for further processing, when certain pressures occur.

In the illustrated working embodiment a lateral wall 72 of the guard housing 59, which faces away from the supporting wall 53, is fitted with several optical indicating elements 73, which are connected with the electrical control unit 58 and for example may indicate the respective state of switching of the individual principal valves and for example also of the respective diagnosis.

In order to render possible a pneumatic connection with the bottom working fluid ducts 34', the base plates 8 are provided with downwardly projecting spurs 74, in which the respective working fluid ducts 34' run and which extend through the printed circuit boards 61 and 62 present.

It will be clear that the electrical control unit 58 may also be arranged on the top side of the row of valve units 2. The design of the example does however possess the advantage that both the pneumatic and also electrical connection may be moved into position from below on the valve arrangement 1.

The advantageous arrangement of the electronic control unit 58 on top of, or more preferably underneath, the row of valve units may furthermore also be adopted, if each base plate is only adapted as a housing for a single principal valve, it also being possible to use a correspondingly reduced number of actuating devices (17 and 17').

We claim:

1. A valve arrangement comprising a plurality of valve units sequentially arranged side by side in a row direction, each valve unit including a base plate having valve ducts, each valve unit further including at least two principal spool valves positioned within respective spool receiving spaces and having a longitudinal axes arranged at a right angle to the row direction and at least one electrically operated actuating device for control of the at least two principal spool valves, the valve ducts including at least one supply duct and at least one venting duct, each of said ducts being in fluid communication with the spool receiving spaces and extending through the base plate in a direction parallel to the row direction from a front surface to a rear surface of the base plate so that each of the ducts communicate with similar valve ducts of an immediately adjacent base plate of another valve unit, wherein the base plate of each respective valve unit comprises a common housing for the at least two principal spool valves and at least two superposed, mutually parallel valve spool receiving spaces in which a respective valve spool is positioned, and the at least one supply duct and the at least one venting duct extend in a partition of the base plate, the partition being located between the at least two valve spool receiving spaces.

2. The valve arrangement as set forth in claim 1, wherein the valve ducts extending in a respective base plate comprise two sets of working fluid ducts for connection to loads and having ports open at mutually opposite top and bottom side surfaces of the base plate.

3. The valve arrangement as set forth in claim 2, wherein the ports present on the top side surface and the ports present on the bottom side surface form a port row, the port row being covered by a connection plate detachably secured to the valve arrangement said connection plate having connection openings communicating with the ports and having attachment means for connection of fluid lines leading to other equipment.

4. The valve arrangement as set forth in claim 1, wherein the partition of a respective base plate includes two venting ducts adjacent to end surfaces of the base plate and a supply duct extending between the two venting ducts.

5. The valve arrangement as set forth in claim 1, wherein at least one electrically operable actuating device is associated with each of the at least two principal spool valves of the base plate, said actuating device being arranged on an end surface of the base plate.

6. The valve arrangement as set forth in claim 5, wherein said at least one actuating device comprises two actuating devices associated with one valve unit.

7. The valve arrangement as set forth in claim 5, wherein each actuating device comprises an electromagnetic device.

8. The valve arrangement as set forth in claim 5, wherein each respective actuating device is a solenoid valve adapted to control action by an actuating fluid on the associated valve spool for causing longitudinal movement thereof.

9. The valve arrangement as set forth in claim 1, wherein the row of valve units is arranged between two terminating plates arranged at a front and rear of the row, respectively, at least one of the terminating plates including connection openings communicating with the supply and venting ducts.

10. The valve arrangement as set forth in claim 1, wherein on at least one side end surface of the row of valve units an attachment plate is provided for the attachment of the valve arrangement to a supporting wall.

11. A valve arrangement comprising a plurality of valve units sequentially arranged side by side in a row direction, each valve unit including a base plate having internal valve ducts, the valve unit further including at least two principal valves positioned within respective spool receiving spaces and a valve spool associated with each principal valve arranged in a movable manner therein and at least one electrically operated actuating device serving for control of the at least two principal valves, the valve ducts including at least one supply duct and at least one venting duct, each of said ducts being in fluid communication with the respective spool receiving spaces and extending through the base plate in a direction parallel to the row direction from a front surface to a rear surface of the base plate so that the ducts may communicate with similar valve ducts of an immediately adjacent base plate of another valve unit, wherein the at least two principal valves are arranged at a right angle to the row direction, the base plate of each respective valve unit comprising a common housing for the at least two principal valves and the at least one supply duct and the at least one venting duct extend in a partition of the base plate, the partition being located between the respective valve spool receiving spaces and wherein the arrangement further includes an electrical control unit attached to the sequentially arranged valve units for controlling the at least one actuating device of the at least two principal valves.

12. The valve arrangement as set forth in claim 11, wherein the electrical control unit comprises at least one printed circuit board extending in the row direction such that the printed circuit board is connected via electrical contact means with each actuating device within the valve arrangement.

13. The valve arrangement as set forth in claim 11, wherein the electrical control unit comprises a field bus communication unit.

14. The valve arrangement as set forth in claim 11, wherein the electrical control unit comprises an electronic control device.

15. The valve arrangement as set forth in claim 13, wherein the field bus communication unit is arranged on a printed circuit board which extends in the row direction.

16. The valve arrangement as set forth in claim 11, wherein the electrical control unit is accommodated in a guard housing installed on the row of valve units, and further wherein at least one lateral housing wall of the guard housing is provided with optical indicating elements connected with the control unit for indicating the switching state of the individual principal valves.

* * * * *